Sept. 8, 1942.   O. J. LEONE   2,295,485
DIFFERENTIAL FLUID METER
Filed Aug. 15, 1939
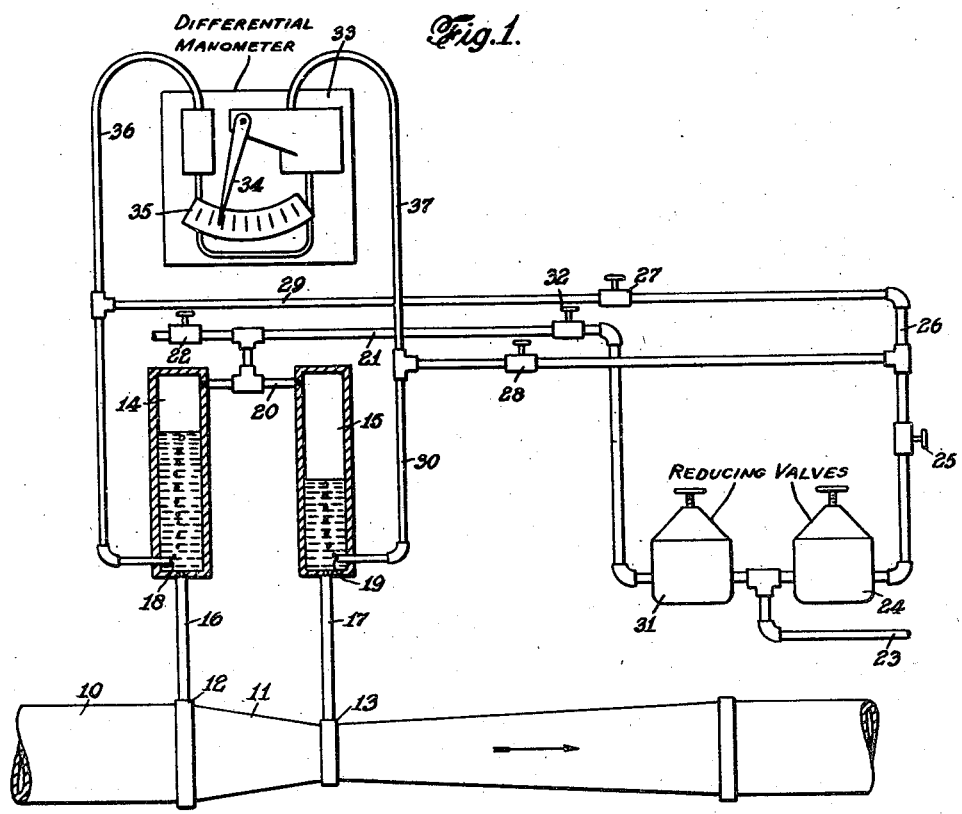
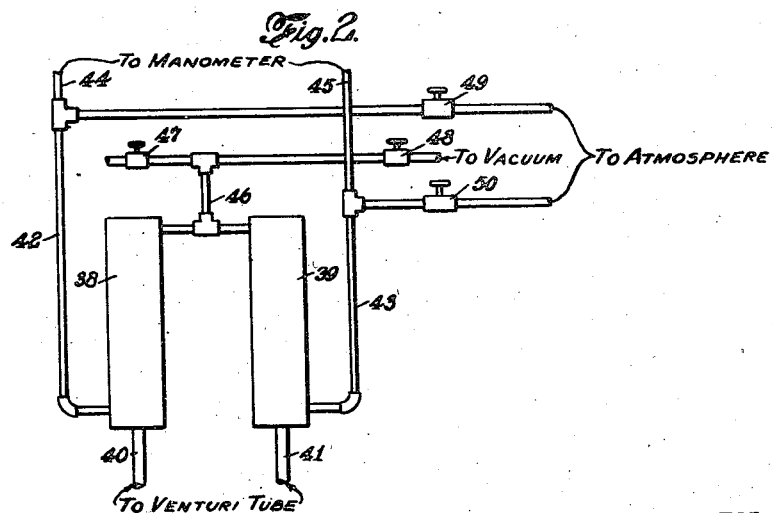
INVENTOR.
OTTO J. LEONE
BY
ATTORNEY.

Patented Sept. 8, 1942

2,295,485

UNITED STATES PATENT OFFICE 2,295,485

DIFFERENTIAL FLUID METER

Otto J. Leone, West Newton, Pa., assignor to The Bristol Company, Waterbury, Conn., a corporation of Connecticut Application August 15, 1939, Serial No. 290,174

10 Claims. (Cl. 73—205)

This invention relates to fluid meters, and more especially to flow meters of the differential-pressure class in which a head-differential in fluid flowing through a constricted conduit is determined by the measurement of back-pressure against streams of air bubbled from orifices of predetermined immersion in columns of liquid subjected to the pressures under measurement.

In the measurement of fluid flow by means of a Venturi tube or an orifice plate or the like, it is quite customary to determine the pressure difference developed across said device due to flow of the fluid by means of measuring the difference in heads of two columns of liquid in vertically disposed chambers communicating directly with the fluid under measurement; and in many cases the fluid in said chambers is the same as that whose flow is being measured, and the several bodies of liquid may be free for a certain degree of interchange. Where the liquid involved is of a nature unsuited to direct contact with the interior parts of measuring instruments, a common expedient has been to cause a stream of air or other gaseous medium to enter each of the chambers through openings placed at predetermined levels and to bubble up through the liquid; and the back-pressure upon each air stream will then be representative of the head of the liquid in the associated chamber, the difference in such pressures becoming a measure of the flow through the Venturi tube or orifice.

The performance of such measurements has heretofore been restricted to installations wherein the surfaces of the two columns of measuring liquid may be maintained directly in communication with the atmosphere, the air used in the measuring system bubbling up therethrough and escaping, so that the use of the method has been confined to applications where the pressure of the fluid under measurement is above atmospheric but not in excess of that represented by practical heights of the vertical columns.

It is an object of this invention to provide flow-measuring means utilizing the "bubbling" principle and applicable to installations wherein the static pressure of the measured liquid may exceed atmospheric by amounts much in excess of values heretofore found practicable.

It is a further object to provide flow-measuring means of the above nature and applicable to installations wherein the static pressure of the measured liquid may be materially below atmospheric pressure.

Another object of the invention is to provide a device of the above nature which shall be flexible in design and readily adaptable to a wide variety of static pressures, flow-rates, and other variables.

Still another object is to provide such a device which shall be simple in construction and readily assembled from a minimum variety of standard parts.

In carrying out the invention, it is proposed to provide a flow-measuring device of the "bubbling" class, in which the surfaces of the liquid in the measuring columns shall be subjected to a pressure other than atmospheric, thus extending the range of usefulness of instruments of this class to systems operating under static pressures not otherwie amenable to this type of flow measurement.

The nature of the invention, however, will best be understood when described in connection with the accompanying drawing, in which:

Fig. 1 is a diagrammatic representation, with certain portions shown partly in section, of a flow meter installation embodying the essential principles of the invention and applicable to use in a system wherein the static pressure of the measured liquid is materially in excess of atmospheric.

Fig. 2 is a fragmentary representation of a similar installation as adapted to use in a system wherein the static pressure of the measured liquid is below atmospheric.

Referring to Fig. 1 of the drawing, 10 designates a conduit adapted to carry a liquid (in a sense from left to right, as shown in the drawing), and having incorporated therein a Venturi tube 11 with two pressure taps 12 and 13 at the entrance and throat of the tube, respectively, whereby, according to principles well known in the art, may be obtained fluid pressure values, the difference between which is a measure of the rate of flow of liquid through the Venturi tube. Two vertically elongated closed chambers 14 and 15, connected at their lower parts through conduits 16 and 17 with taps 12 and 13, respectively, are adapted to receive and contain columns of liquid communicating through said conduits and taps with the liquid flowing through the Venturi tube.

Openings 18 and 19 located within the lower portions of the chambers 14 and 15, respectively, and preferably at a common level, provide for the admission of air or other gaseous medium under pressure into the body of liquid contained in each of said chambers. The upper parts of the chambers 14 and 15 are placed in free communication with each other, by means of a conduit 20; and a conduit 21 communicating with the same provides for the admission of air under pressure to the space so formed. A vent or bleeder valve 22 provides constricted orifice communication between said space and the external atmosphere, and is adjusted to a suitable fixed opening determined by operating characteristics.

Compressed air, or other gaseous medium, from a source 23 is admitted through a regulating and reducing valve 24 and a needle valve 25 to a conduit 26, whence, through two independently adjustable needle valves 27 and 28, it is admitted to conduits 29 and 30 communicating with the openings 18 and 19, respectively, which are located within the chambers 14 and 15. A regulating and reducing valve 31, also supplied from the source 23, but independent of the reducing valve 24, is connected through a needle valve 32 to the conduit 21, whereby air under regulated pressure and flow may be admitted to said conduit and to the upper parts of the respective chambers 14 and 15.

A differential manometer or pressure gauge 33 is provided, having a pointer or index 34, which provides on an adjacent graduated scale 35 an indication of the difference in fluid pressures in two conduits 36 and 37 connected to the instrument and communicating respectively with the conduits 29 and 30.

The operation of the device is as follows: Upon a flow of liquid being established through the Venturi tube 11, air under pressure is admitted to the upper parts of the chambers 14 and 15 from the source 23, as hereinbefore set forth, and its pressure adjusted by means of the reducing valve 31 until the liquid levels within the two chambers will both remain within the chambers throughout the whole range of measurement. Air is then admitted through the reducing valve 24 and the needle valves 25, 27, and 28 to the conduits 29 and 30, and thus to the openings 18 and 19, whence it will bubble up through the columns of liquid within the chambers 14 and 15.

The valves 27 and 28 provide independent adjustment of the air streams to the bubbling orifices 18 and 19, respectively, while the valve 25 provides simultaneous adjustment of both streams of air without material change in proportion. The bleeder valve 22 is adjusted to exhaust the air from the upper part of the chambers 14 and 15 to the atmosphere at a rate equivalent to that at which it is admitted through the three conduits 21, 29 and 30 as controlled by the corresponding needle valves in said conduits, thus maintaining the liquid surfaces in said chambers within the normal working range. A stable condition having thereby been established, the static pressure in the upper part of the chambers 14 and 15 will be substantially equivalent to that in the conduit 10, and the back-pressures in the two conduits 29 and 30 will become representative of the pressures at the taps 12 and 13, respectively. The differential manometer 33, measuring the difference in these pressure values, will thus provide a measure of the flow through the Venturi tube 11, and will effect this measurement without any contact between the liquid flowing in the conduit 10 and the interior parts of the instrument.

In Fig. 2 is shown a manner of utilizing the principles of the invention where the static pressure existing in the Venturi tube is of an order below normal atmospheric. Vertically disposed chambers 38 and 39, similar in all respects to the chambers 14 and 15 of the embodiment shown in Fig. 1, are provided, and are fitted with connecting conduits 40 and 41, adapted to place the lower portions of said chambers in communication with the entrance and throat, respectively, of a Venturi tube (not shown in the drawing).

Conduits 42 and 43, leading to openings within said chambers and near their lower parts, provide means for the admission of atmospheric air to the same; and conduits 44 and 45 communicating therewith are adapted for connection to the respective sides of a differential manometer (not shown in the drawing, but similar in all respects to the instrument 33 shown in Fig. 1). A conduit 46 communicating with the chambers 38 and 39 at their upper portions coordinates said upper parts into a common space, and a needle valve 47 provides adjustably constricted communication of said space with the atmosphere. Conduit 46 communicates through a needle valve 48 with a suitable source of regulated vacuum, and conduits 42 and 43 through needle valves 49 and 50 with the atmosphere.

The operation of the device in the form shown in Fig. 2, so far as relative pressure values are concerned, is identical with that of the embodiment shown in Fig. 1. Assuming the static pressures within the Venturi tube to be below atmospheric, the pressure within the chambers 38 and 39 is reduced to such a value that columns of liquid will be forced from the Venturi tube through the conduits 40 and 41 into said chambers, and their surfaces maintained at levels both within the chambers throughout the whole range of flow values involved in the measurement. Atmospheric air is then admitted through the needle valves 49 and 50 and allowed to bubble up gently through the columns of liquid in the chambers, and the needle valve 47 is adjusted until a condition of equilibrium is attained between inflowing and outflowing air with the said liquid levels remaining within the chambers. Under this condition, the differential of pressure between the conduits 44 and 45 will become representative of the flow to be measured, and will not be affected by moderate variations in the static pressure of the liquid flowing through the Venturi tube.

I claim:

1. In a device for measuring the rate of flow of a liquid through a conduit provided with two openings and having means between said openings for developing at said openings fluid pressures differing by an amount representative of the rate of said flow: two enclosed chambers containing liquid and each communicating with one of said openings whereby the liquid in each chamber is maintained at a level representative of the pressure at the corresponding opening, a source of gaseous medium, separate means for admitting said medium independently under pressure to each of said chambers at points below the surfaces of the liquid therein and including conduits for conveying said medium to said chambers, means placing said chambers in mutual communication above the surface of said liquid, an instrument for measuring the difference of pressure in said conveying conduits and connected therewith, and external regulatory means for maintaining in said chambers above said liquid a pressure lower than either of said measured pressures, together with constricted constant flow means independent of said regulatory means and continually tending to equalize with atmospheric pressure the pressure in said chambers above said liquid.

2. In a device for measuring the rate of flow of a liquid through a conduit with a portion provided with two openings and having means between said openings for developing at said openings fluid pressures differing by an amount representative of the rate of said flow: two enclosed chambers communicating at their upper portions in a common enclosed space, each chamber containing liquid and communicating at its lower portion respectively with one of said openings whereby said liquid in each chamber is maintained at a level representative of the pressure at the corresponding opening, a source of gaseous medium, separate means for admitting said medium independently under pressure to each of said chambers below the surface of liquid therein and including conduits for conveying said medium to said chambers, an instrument for measuring the difference of pressure in said conveying conduits and connected therewith, external regulatory means for maintaining in said space a pressure lower than either of said measured pressures, together with constricted constant flow means independent of said regulatory means and continually tending to equalize the pressure in said space with atmospheric pressure.

3. In a device for measuring the rate of flow of a liquid through a conduit with a portion provided with two openings and having means between said openings for developing at said openings fluid pressures differing by an amount representative of the rate of said flow: two enclosed chambers communicating at their upper portions in a common enclosed space, each chamber containing liquid and communicating at its lower portion respectively with one of said openings whereby said liquid in each chamber is maintained at a level representative of the pressure at the corresponding opening, a source of gaseous medium, separate means for admitting said medium independently under pressure to each of said chambers at a common level below the surface of liquid therein and including conduits for conveying said medium to said chambers, an instrument for measuring the difference of pressure in said conveying conduits and connected therewith, external regulatory means for maintaining in said space a pressure lower than either of said measured pressures, together with constricted constant flow means independent of said regulatory means and continually tending to equalize the pressure in said space with atmospheric pressure.

4. In a device for measuring the rate of flow of a liquid through a conduit with a portion provided with two openings and having means between said openings for developing at said openings fluid pressures differing by an amount representative of the rate of said flow: two enclosed chambers communicating at their upper portions in a common enclosed space, each chamber containing liquid and communicating at its lower portion respectively with one of said openings whereby said liquid in each chamber is maintained at a level representative of the pressure at the corresponding opening, a source of gaseous medium, separate means for admitting said medium independently under pressure to each of said chambers below the surface of liquid therein and including conduits for conveying said medium to said chambers, an instrument for measuring the difference of pressure in said conveying conduits and connected therewith, together with external and independent means for admitting to said space independently of said first-named admitting means a gaseous medium at a pressure lower than either of said measured pressures, and rigid means providing a constant restricted communication between said space and the atmosphere.

5. In a device for measuring the rate of flow of a liquid through a conduit and at a static pressure below atmospheric, a portion of said conduit having two openings and means between the openings for developing at said openings fluid pressures differing by an amount representative of the rate of said flow: two enclosed chambers communicating at their upper portions in a common space and each containing liquid and each communicating at its lower portion with one of said openings whereby said liquid in each chamber is maintained at a level representative of the pressure at the corresponding opening, separate means for admitting air directly from the atmosphere to each of said chambers below the level of the liquid therein and including conduits for conveying said air to said chambers, constrictions in said conduits between the atmosphere and said chambers, an instrument for measuring the difference of pressure in said conduits and connected therewith, a source of vacuum, means providing continuously restricted communication between said source and said space, and means providing restricted communication directly between said space and the atmosphere.

6. In a device for performing a measurement based on the difference of two fluid pressures and including two vertically disposed enclosed chambers containing columns of liquid, and means for subjecting said columns respectively to said two pressures whereby said columns are maintained with their surfaces at levels representative of said pressures: two external sources of gaseous fluids at substantially constant but different absolute pressures, one of which may be atmospheric, conduit means placing the portions of said chambers above said columns in communication with both said sources whereby a flow of gaseous fluid may take place therethrough, rigidly constricted portions in said conduit means adapted upon flow of said fluid therethrough to maintain the pressure above each of said columns at a value intermediate the pressures of said sources, a further source of gaseous fluid, means for causing the latter fluid to bubble upward through each of said columns and including conduits for conveying said fluid from said last-named source to said chambers, and an instrument for measuring the difference of pressure in said conveying conduits and connected thereto.

7. In a device for performing a measurement based on the difference of two fluid pressures and including two vertically disposed enclosed chambers containing columns of liquid, said chambers having respective openings below the level of the liquid of said columns, and means for subjecting said columns respectively to said two pressures whereby the columns are maintained with their surfaces at levels representative of said pressures: a source of gaseous medium and conduits for conducting said medium from said source to said chambers through the openings therein to bubble upward through each of said columns, an external and independent source of gaseous fluid at a substantially constant pressure, a conduit connecting said source of constant pressure with both chambers to maintain therein above the columns a constant pressure irrespective of the admission of fluid thereto, together with a constricted communication therefor to the atmosphere, and an instrument for measuring the difference in pressure in said conducting conduits and connected therewith.

8. In a device for performing a measurement based on the difference of two fluid pressures and including two vertically disposed enclosed chambers containing columns of liquid and each chamber having in its lower part an opening through which gaseous fluid may be admitted to the same beneath the surface of the liquid to bubble up therethrough, and means for subjecting said columns respectively to said two pressures whereby said two columns are maintained with their surfaces at levels representative of said pressures: two external sources of gaseous fluid at substantially constant but different absolute pressures, conduit means through which may take place an interchange of gaseous fluid between the source at lower pressure and the portions of said chambers above said columns, and a fixed orifice whereby said portions of the chambers are placed in restricted communication with the atmosphere, means including separate conduits for conducting fluid from said source having the higher pressure to said respective chamber openings to cause said fluid to bubble upward through said columns of liquid, together with an instrument for measuring the differences of pressure in said conducting means and connected therewith.

9. In a device for performing a measurement based on the difference of two fluid pressures and including two vertically disposed enclosed chambers containing columns of liquid and each chamber having in its lower part an opening through which gaseous fluid may be admitted to the same beneath the surface of the liquid to bubble up therethrough, and means for subjecting said columns respectively to said two pressures whereby said two columns are maintained with their surfaces at levels representative of said pressures: two external sources of gaseous fluid at substantially constant but different absolute pressures, conduit means through which may take place an interchange of gaseous fluid between the source at lower pressure and the portions of said chambers above said columns, a rigidly constricted portion in said conduit adapted upon flow of said fluid therethrough to maintain a difference in fluid pressure between said external source and said chamber portions, and a fixed orifice whereby said portions of the chambers are placed in restricted communication with the atmosphere, means including separate conduits for conducting fluid from said source having the higher pressure to said respective chamber openings to cause said fluid to bubble upward through said columns of liquid, together with an instrument for measuring the differences of pressure in said conducting means and connected therewith.

10. In a device for performing a measurement based on the difference of two fluid pressures and including two vertically disposed enclosed chambers containing columns of liquid and each chamber having in its lower part an opening through which gaseous fluid may be admitted to the same beneath the surface of the liquid to bubble up therethrough, and means for subjecting said columns respectively to said two pressures whereby said two columns are maintained with their surfaces at levels representative of said pressures: two pressure regulators adapted to receive a gaseous fluid from a common supply and to serve as independent sources of said fluid at predetermined but different pressures both lower than either of the pressures whose difference is to be measured, conduit means through which may take place an interchange of gaseous fluid between the source at lower pressure and the portions of said chambers above said columns, a rigidly constricted portion in said conduit adapted upon flow of said fluid therethrough to maintain a difference in fluid pressure between said external source and said chamber portions, and a fixed orifice whereby said portions of the chamber are placed in restricted communication with the atmosphere, means including separate conduits for conducting fluid from said source having the higher pressure to said respective openings to cause said fluid to bubble upward through said columns of liquid, together with an instrument for measuring the differences of pressure in said conducting means and connected therewith.

OTTO J. LEONE.